United States Patent
Yamada et al.

[11] Patent Number: 5,749,600
[45] Date of Patent: May 12, 1998

[54] DOOR TRIM ENERGY ABSORBING STRUCTURE

[75] Inventors: Shigeo Yamada, Okazaki; Takero Kato; Hiromi Nagai, both of Toyota; Kazuo Kitamura, Kariya, all of Japan

[73] Assignee: Toyota Jidosha Kabushiki Kaisha, Toyota, Japan

[21] Appl. No.: 937,744

[22] Filed: Sep. 25, 1997

Related U.S. Application Data

[63] Continuation of Ser. No. 521,757, Aug. 31, 1995, abandoned.

[30] Foreign Application Priority Data

Aug. 31, 1994 [JP] Japan .................... 6-206821

[51] Int. Cl.⁶ .................................. B60R 21/04
[52] U.S. Cl. .................. 280/751; 296/153; 296/189
[58] Field of Search .................. 280/748, 751, 280/752; 296/153, 189

[56] References Cited

U.S. PATENT DOCUMENTS

| | | | |
|---|---|---|---|
| 4,272,103 | 6/1981 | Schmid et al. | 280/751 |
| 4,783,114 | 11/1988 | Welch | 280/751 |
| 5,102,163 | 4/1992 | Ishikawa | 280/751 |
| 5,181,759 | 1/1993 | Doolittle | 296/153 |
| 5,306,066 | 4/1994 | Saathoff | 280/751 |
| 5,395,135 | 3/1995 | Lim et al. | 280/751 |
| 5,482,344 | 1/1996 | Walker et al. | 280/751 |
| 5,527,084 | 6/1996 | Scherf | 280/751 |
| 5,542,738 | 8/1996 | Walker et al. | 296/189 |

FOREIGN PATENT DOCUMENTS

| | | | |
|---|---|---|---|
| 3238901 | 4/1984 | Germany | 280/751 |
| 3 28020 | 2/1991 | Japan . | |
| 3 49110 | 5/1991 | Japan . | |
| 3 49111 | 5/1991 | Japan . | |
| 4293640 | 10/1992 | Japan . | |
| 5 65045 | 3/1993 | Japan . | |
| 6 72153 | 3/1994 | Japan . | |
| 6-191275 | 7/1994 | Japan | 280/751 |

*Primary Examiner*—Paul N. Dickson
*Attorney, Agent, or Firm*—Cushman Darby & Cushman IP Group of Pillsbury Madison & Sutro LLP

[57] ABSTRACT

A door trim energy absorbing structure. A door trim is provided at a vehicle inner side of a door member. An energy absorbing member is provided at the door trim so as to correspond to a position in a vicinity of a femur of a vehicle occupant. The energy absorbing member absorbs energy from a vehicle exterior.

14 Claims, 12 Drawing Sheets

DOOR TRIM ENERGY ABSORBING STRUCTURE

This is a continuation of application Ser. No. 08/521,757, filed on Aug. 31, 1995, now abandoned.

BACKGROUND OF THE INVENTION

1. Field of the Invention

The present invention relates to a door trim energy absorbing structure for protecting a vehicle occupant when a door trim collides against the vehicle occupant.

2. Description of the Related Art

Various types of energy absorbing structures have been proposed which improve the vehicle occupant protection characteristic at the time a door trim of a door of an automobile collides against a vehicle occupant when a predetermined load is applied to an outer panel of the door of the automobile (refer to, for example, Japanese Utility Model Application Laid-Open No. 3-49111). Hereinafter, the structure disclosed in this publication will be briefly described. In FIG. 12, the arrow UP points in the upward direction of the vehicle, and the arrow IN points inwardly in the transverse direction of the vehicle.

As illustrated in FIG. 12, energy absorbing members 74, 76, which absorb the collision energy during a side collision, are provided at the vehicle compartment inner side (i.e., in the direction of the arrow IN) of a door inner panel 72 of a side door 70 of a vehicle. The energy absorbing member 74 is a chest portion energy absorbing member which corresponds to the chest portion of a vehicle occupant, whereas the energy absorbing member 76 is a hip portion energy absorbing member which corresponds to the hip portion of a vehicle occupant. The thickness M1 of the hip portion energy absorbing member 76 in the direction of thickness of the vehicle is greater than the thickness M2 of the chest portion energy absorbing member 74 in the direction of the thickness of the vehicle. The effects on the chest portion of a vehicle occupant during a side collision are made small.

However, in this door trim energy absorbing structure, the hip portion energy absorbing member 76 is disposed so as to abut against the entire hip portion of the vehicle occupant during a side collision. In order to make the load applied to the lumbar vertebrae positioned above the hip portion small, the hip portion energy absorbing member 76 must be made larger and thicker. Drawbacks arise in that the hip portion energy absorbing member becomes large, and the space within the vehicle compartment becomes more narrow.

SUMMARY OF THE INVENTION

In view of the aforementioned, an object of the present invention is to provide a door trim energy absorbing structure in which the narrowing of the space within the vehicle compartment due to an energy absorbing member can be suppressed.

A first aspect of the present invention is a door trim energy absorbing structure comprising: a door member disposed at a vehicle side portion; a door trim provided at a vehicle inner side of the door member; and an energy absorbing member absorbing energy from a vehicle exterior and provided at the door trim so as to correspond to a position in a vicinity of a femur of a vehicle occupant.

In a second aspect of the present invention, in the first aspect, the energy absorbing member is provided between the door trim and a door outer panel which forms the door member, and the energy absorbing member moves in a direction of a vehicle inner side when load is applied to a vehicle side portion from the vehicle exterior.

A third aspect of the present invention is a door trim energy absorbing structure comprising: a door member disposed at a vehicle side portion; a door trim provided at a vehicle inner side of the door member; and an incorporated member forming the door trim and protruding into a vehicle compartment, the incorporated member absorbing load applied from a vehicle compartment inner side to a vehicle compartment outer side by a region of the incorporated member, which region corresponds to a position of an ilium of a vehicle occupant, deforming due to the load.

A fourth aspect of the present invention is a door trim energy absorbing structure comprising: a door member disposed at a vehicle side portion; a door trim provided at a vehicle inner side of the door member; an energy absorbing member absorbing energy from a vehicle exterior and provided at the door trim so as to correspond to a position in a vicinity of a femur of a vehicle occupant; and a bracket mounting the energy absorbing member to a door outer panel forming the door member, the bracket having a movement regulating member which regulates vertical direction movement of the energy absorbing member.

In accordance with the first aspect of the present invention, when another vehicle pushes from the vehicle side in the direction of the vehicle compartment inner side, the energy absorbing member moves in the direction of the vehicle occupant and presses the femur region of the vehicle occupant in the direction of the vehicle compartment inner side. The energy absorbing member is disposed at a region corresponding to the femur of the vehicle occupant. Therefore, at this time, due to deformation of the energy absorbing member, the energy absorbing function is exhibited, and the pelvis of the vehicle occupant is moved in the direction of the vehicle compartment inner side. Namely, the vehicle occupant is rotated around a point beneath the lumbar vertebrae.

In the present invention, there is no energy absorbing member which abuts the ilium of the vehicle occupant. Therefore, the input to the ilium is small, and due to the aforementioned rotation of the vehicle occupant, a theoretically negative acceleration, i.e., acceleration in the direction of the vehicle compartment outer side, is applied to the lumbar vertebrae of the vehicle occupant. Therefore, the acceleration generated at the lumbar vertebrae of the vehicle occupant can be decreased.

Further, in the present invention, because there is no energy absorbing member which abuts the ilium of the vehicle occupant, narrowing of the space in the vehicle compartment can be suppressed.

Accordingly, in accordance with the first aspect of the present invention, the energy absorbing member is disposed at the door trim in a vicinity of the hip portion of the vehicle occupant, and is disposed only at a region corresponding to the femur of the vehicle occupant. Therefore, an excellent effect is achieved in that narrowing of the space within the vehicle interior can be suppressed.

In accordance with the second aspect of the present invention, the energy absorbing member is usually positioned between the door trim and the door outer panel, and moves into the vehicle compartment during a side collision. Therefore, the space within the vehicle compartment can be made even more wide.

In accordance with the third aspect of the present invention, the incorporated member, which is positioned at the side of the ilium of the vehicle occupant and which protrudes toward the vehicle compartment inner side, deforms due to load applied from the vehicle compartment inner side to the vehicle compartment outer side. Therefore, energy is not absorbed at the ilium region of the vehicle occupant, and is actively absorbed only at the femur region. In this way, the input to the ilium can be made small, and due to the rotation of the vehicle occupant, a theoretically negative acceleration, i.e., acceleration toward the vehicle compartment outer side, is applied to the lumbar vertebrae of the vehicle occupant. Therefore, the acceleration generated at the lumbar vertebrae of the vehicle occupant can be reduced.

In the third aspect, the incorporated member, which is an arm rest or a door pocket which is positioned at the side of the ilium of the vehicle occupant and which protrudes within the vehicle compartment, easily deforms due to load applied from the vehicle compartment inner side to the vehicle compartment outer side. Therefore, an excellent effect is achieved in that narrowing of the space within the vehicle compartment can be suppressed.

In accordance with the fourth aspect of the present invention, because the movement regulating portion, which regulates vertical direction movement of the energy absorbing member, is formed at a bracket, movement of the energy absorbing member toward the vehicle compartment inner side can be controlled. Further, this energy absorbing member can effectively be made to abut an energy absorbing member provided at the door inner panel. Accordingly, the energy absorbing member which corresponds only to the femur region and which is relatively small can effectively abut the femur region of the vehicle occupant without being made large. Narrowing of the space within the vehicle compartment can be suppressed.

In the fourth aspect of the present invention, the movement regulating portion, which regulates the vertical direction movement of the energy absorbing member, is provided at the bracket which mounts the energy absorbing member to the door outer panel. Therefore, a superior effect is achieved in that narrowing of the space within the vehicle compartment can be suppressed.

DESCRIPTION OF THE PREFERRED EMBODIMENTS

Figure 1:
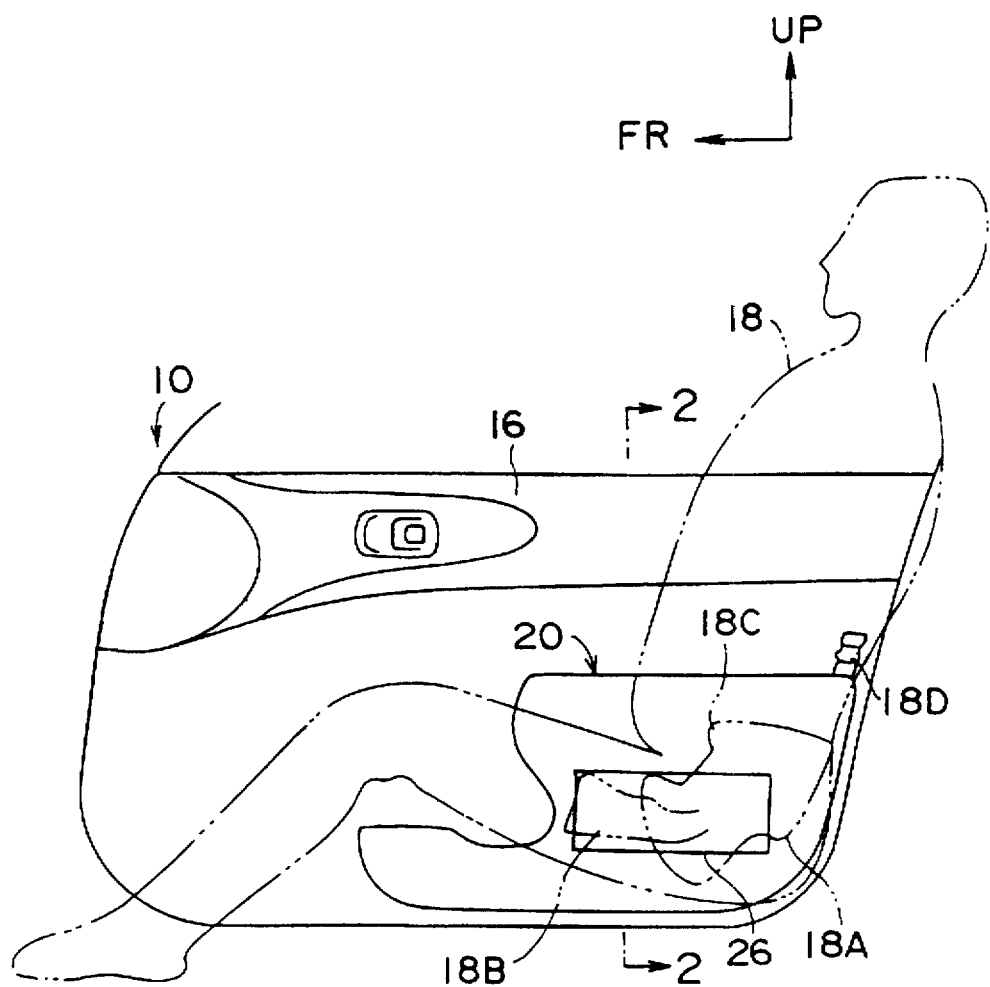
FIG. 1 is a schematic side view illustrating a door trim energy absorbing structure relating to a first embodiment of the present invention.

A first embodiment of a door trim energy absorbing structure of the present invention will be described hereinafter in accordance with FIGS. 1 and 2.

In the drawings, the arrow FR points in the front direction of the door, the arrow UP points in the upward direction of the door, and the arrow IN points in the direction of the vehicle compartment inner side.

Figure 2:
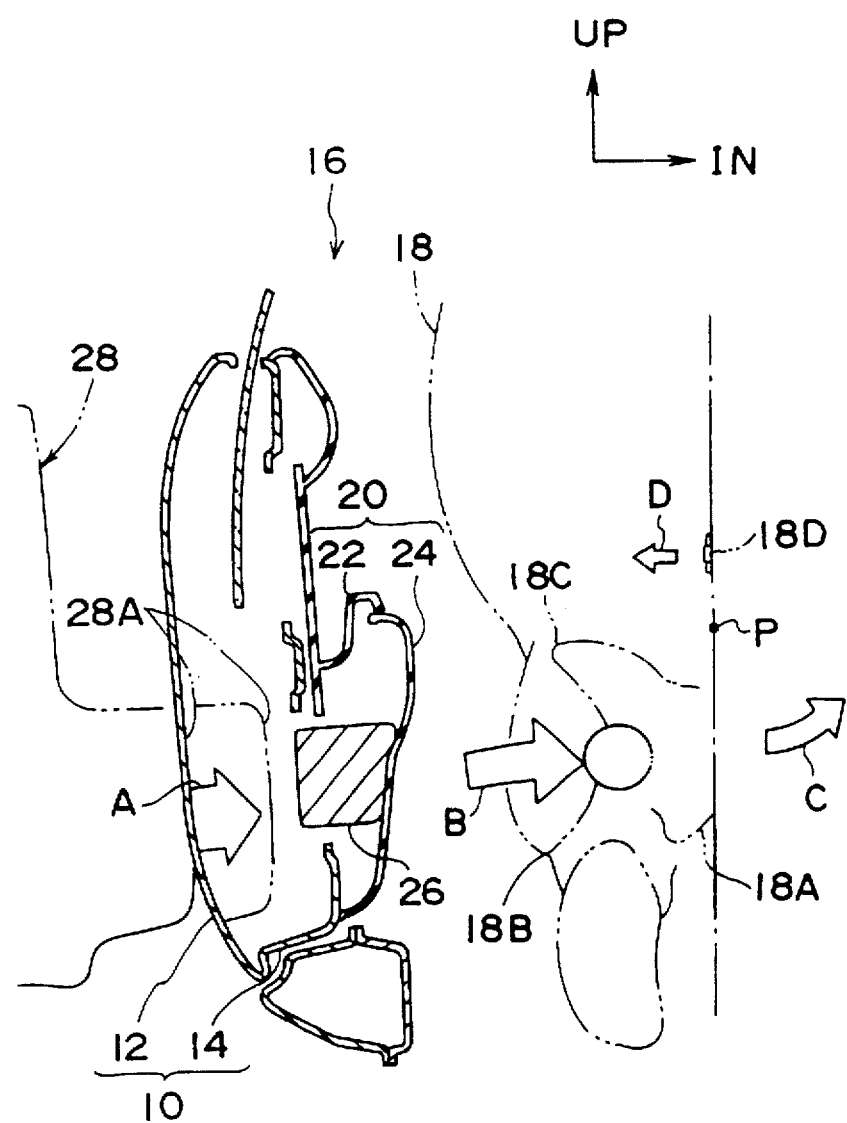
FIG. 2 is a cross-sectional view taken along line 2—2 of FIG. 1.

As illustrated in FIG. 2, a front side door 10 for an automobile is provided as a door main body having a hollow interior. The front side door 10 is formed from a door outer panel 12 disposed at the vehicle compartment outer side and a door inner panel 14 disposed at the vehicle compartment inner side with respect to the door outer panel 12. A door trim 16 is mounted to the vehicle compartment inner side of the door inner panel 14 at the door main body.

As illustrated in FIG. 1, an arm rest 20 is formed at a region of the door trim 16 opposing a pelvis 18A of a vehicle occupant 18 seated in an unillustrated front seat.

As shown in FIG. 2, the arm rest 20 is formed by an arm rest upper 22 and an arm rest lower 24. The arm rest lower 24 swells in the direction of the vehicle compartment inner side. An energy absorbing member 26 is disposed at a vehicle compartment outer side region of the arm rest lower 24, which region corresponds to a door vertical direction position of a femur 18B of the vehicle occupant 18. The energy absorbing member 26 is formed of a urethane pad, resin ribs, or the like. The energy absorbing member 26 has a surface area which can correspond to the position of the femur 18B which moves in accordance with movement of an unillustrated vehicle seat in longitudinal directions and vertical directions of the vehicle.

In FIGS. 1 and 2, reference numeral 18C denotes an ilium, and reference numeral 18D denotes the lumbar vertebrae.

Next, operation of the first embodiment will be described.

As shown in FIG. 2, when a bumper 28A of another vehicle 28 abuts the front side door 10 and pushes the front side door 10 in the direction of the vehicle compartment inner side (the direction of arrow A in FIG. 2) (i.e., when load is applied in the direction of the vehicle compartment inner side), the energy absorbing member 26 within the arm rest lower 24 moves in the direction of the vehicle occupant (in the direction of arrow B in FIG. 2). A vicinity of the femur 18B of the vehicle occupant 18 is pushed in the direction of the vehicle compartment inner side via the arm rest lower 24 of the door trim 16.

The energy absorbing member 26 is disposed only at the region corresponding to the femur 18B of the vehicle occupant 18. Therefore, at this time, due to the deformation of the energy absorbing member 26, the energy absorbing function is exhibited, and the pelvis 18A of the vehicle occupant 18 is moved toward the vehicle compartment inner side. Specifically, the vehicle occupant 18 is rotated in the direction of arrow C in FIG. 2 around a point P beneath the lumbar vertebrae 18D.

In the first embodiment, there is no energy absorbing member which abuts the ilium 18C of the vehicle occupant 18. Therefore, the input to the ilium 18C is small. Further, due to the rotation of the vehicle occupant 18 in the direction of arrow C, a theoretically negative acceleration, i.e., an acceleration toward the vehicle compartment outer side (the direction of arrow D in FIG. 2), is applied to the lumbar vertebrae 18D. Therefore, the acceleration generated at the lumbar vertebrae of the vehicle occupant 18 can be reduced.

Next, a second embodiment of the door trim energy absorbing structure of the present invention will be described in accordance with FIG. 3.

Members which are the same as those of the first embodiment are denoted by the same reference numerals, and description thereof is omitted.

Figure 3:
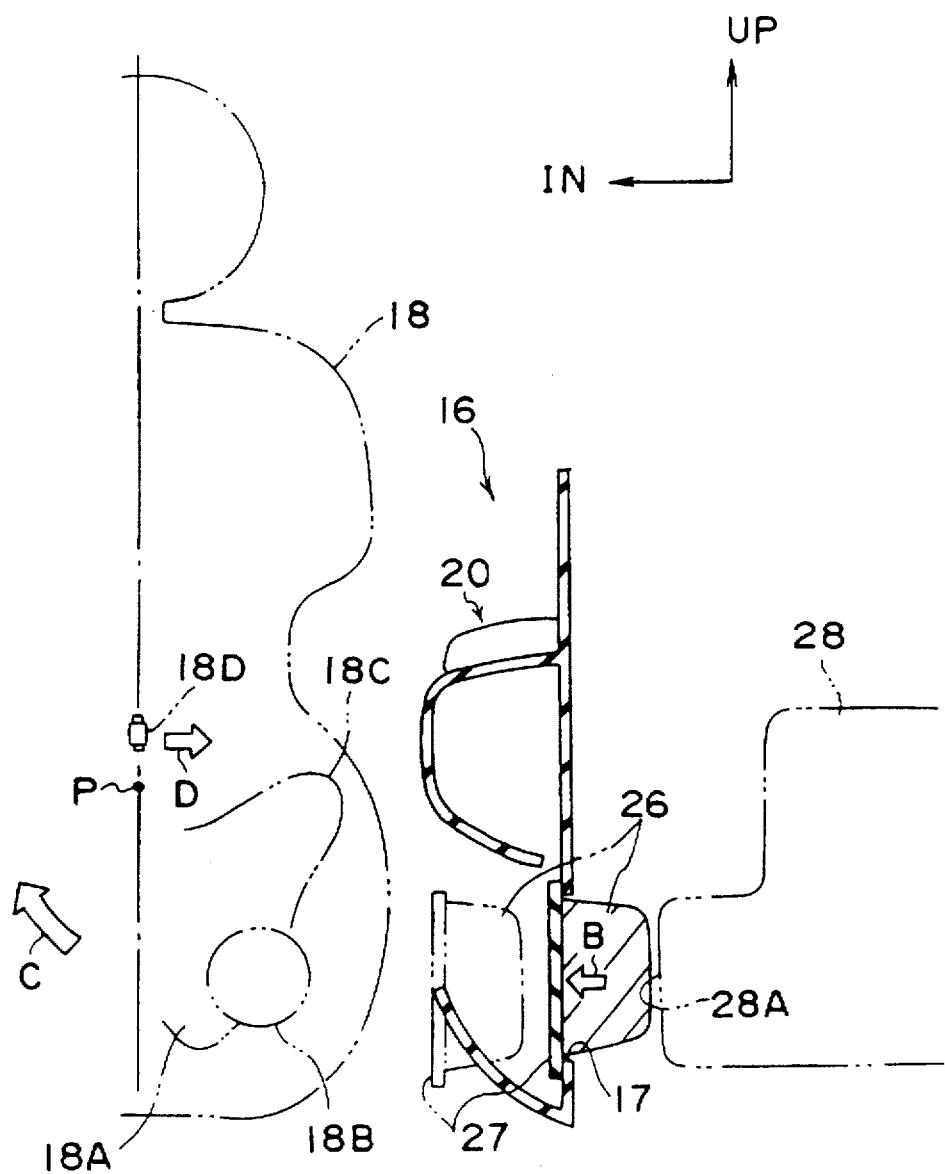
FIG. 3 is a cross-sectional view illustrating a door trim energy absorbing structure relating to a second embodiment of the present invention.

As illustrated in FIG. 3, in the second embodiment, the energy absorbing member 26 is fixed to a plate-shaped bracket 27 serving as a holding member. The outer peripheral portion of the bracket 27 abuts, from the vehicle compartment inner side, the periphery of an opening portion 17 formed in the door trim 16. The energy absorbing member 26 is provided so as to protrude toward the vehicle compartment outer side. The bracket 27 and the door trim 16 are point-joined at points spaced apart at predetermined intervals along the peripheral direction.

Next, operation of the second embodiment will be described.

When the bumper 28A of another vehicle 28 abuts the front side door and pushes the front side door in the direction of the vehicle compartment inner side, the energy absorbing member 26 is pushed in the direction of the vehicle occupant (in the direction of arrow B in FIG. 3) by the bumper 28A. The point-joining of the bracket 27 and the door trim 16 is thereby cancelled. The energy absorbing member 26 moves in the direction of arrow B to the position illustrated by the imaginary lines in FIG. 3, and pushes a vicinity of the femur 18B of the vehicle occupant 18 in the direction of the vehicle compartment inner side.

The energy absorbing member 26 is disposed only at the region corresponding to the femur 18B of the vehicle occupant 18. Therefore, at this time, due to the deformation of the energy absorbing member 26, the energy absorbing function is exhibited, and the pelvis 18A of the vehicle occupant 18 is moved toward the vehicle compartment inner side. Specifically, the vehicle occupant 18 is rotated in the direction of arrow C in FIG. 3 around the point P beneath the lumbar vertebrae 18D.

In the second embodiment, there is no energy absorbing member which abuts the ilium 18C of the vehicle occupant 18. Therefore, the input to the ilium 18C is small. Further, due to the rotation of the vehicle occupant 18 in the direction of arrow C, a theoretically negative acceleration, i.e., an acceleration toward the vehicle compartment outer side (the direction of arrow D in FIG. 3), is applied to the lumbar vertebrae 18D of the vehicle occupant 18. Therefore, the acceleration generated at the lumbar vertebrae of the vehicle occupant 18 can be reduced.

A third embodiment of the door trim energy absorbing structure of the present invention will be described in accordance with FIGS. 4 through 6.

Members which are the same as those of the first embodiment are denoted by the same reference numerals, and description thereof is omitted.

Figure 4:
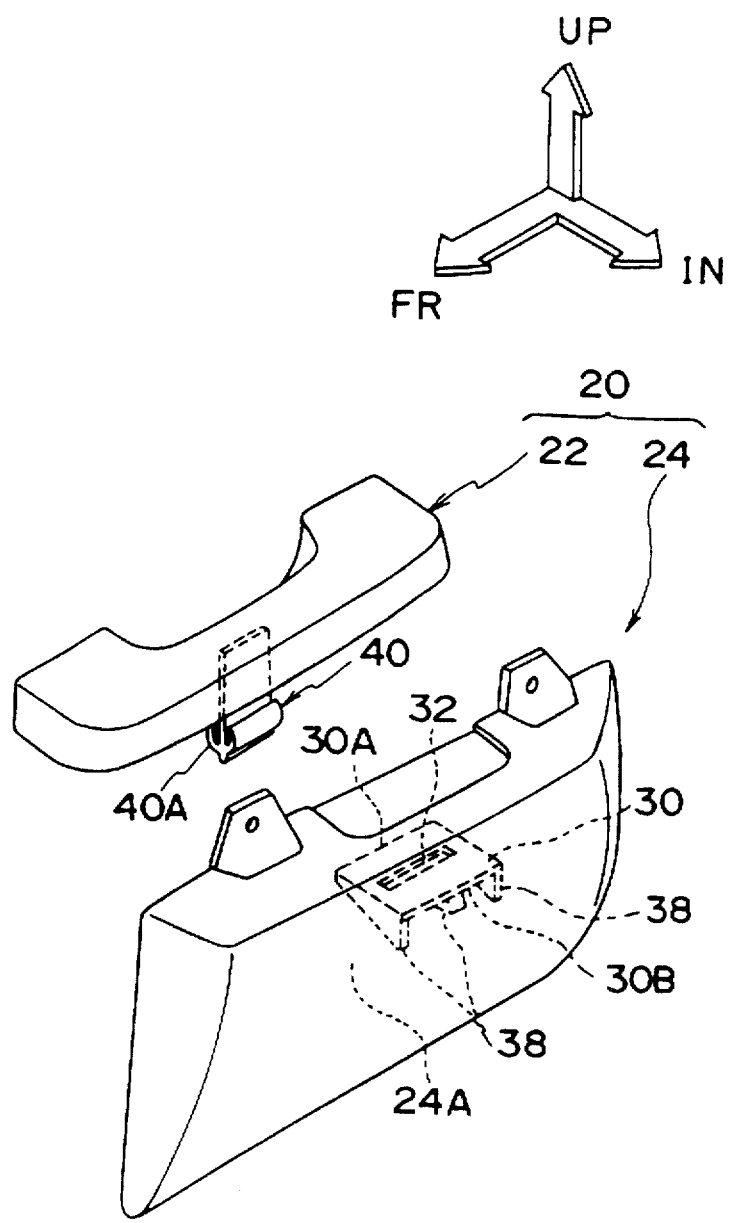
FIG. 4 is a perspective view viewed diagonally and from the front inner side, and illustrating a door trim energy absorbing structure relating to a third embodiment of the present invention.
Figure 5:
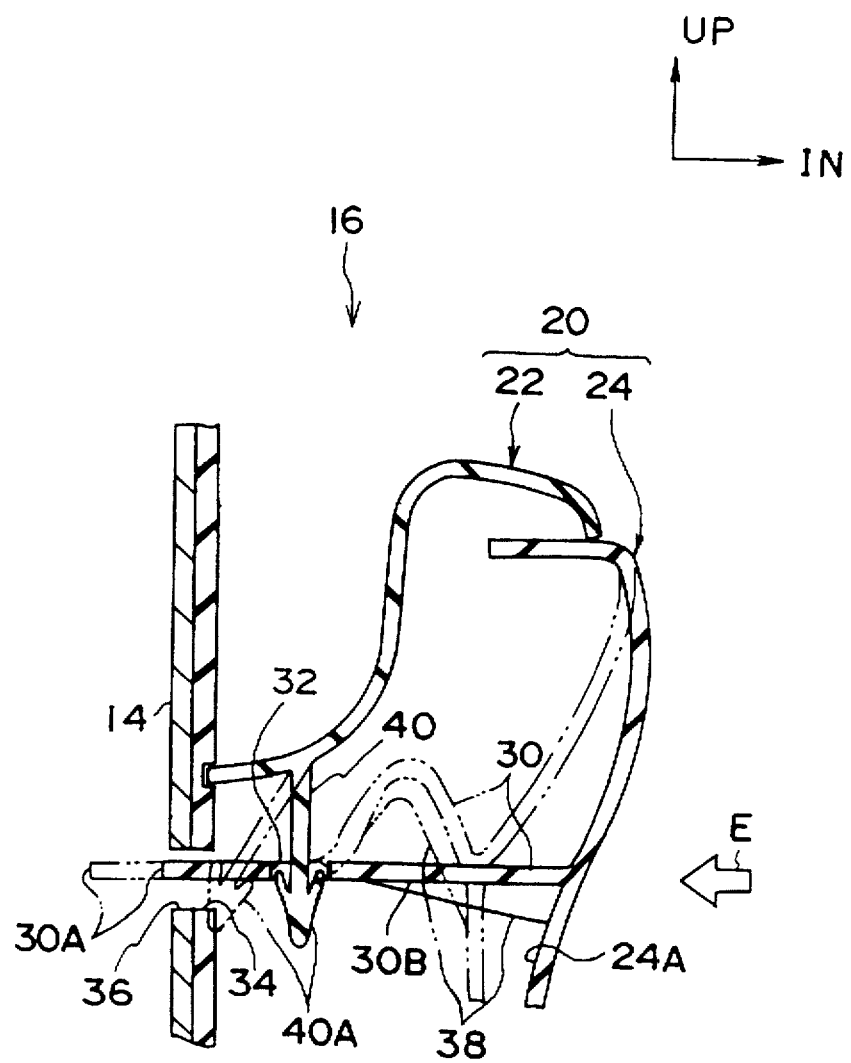
FIG. 5 is a cross-sectional view illustrating the door trim energy absorbing structure relating to the third embodiment of the present invention.

As shown in FIGS. 4 and 5, a clip seat 30, which serves as an arm rest upper fixing member, is provided so as to project toward the vehicle compartment outer side at a substantially central portion of a reverse surface 24A of the arm rest lower 24. The clip seat 30 is formed as a plate-shape which extends in the longitudinal direction of the vehicle. A rectangular engagement hole 32 which extends in the longitudinal direction of the vehicle is formed in a vicinity of a vehicle outer side direction distal end portion 30A of the clip seat 30.

As illustrated in FIG. 5, the distal end portion 30A of the clip seat 30 is inserted into a through hole 34, which is formed in the door trim 16, and a through hole 36 of the door inner panel 14, which is formed so as to correspond to the through hole 34. Further, a plurality of ribs 38 is formed so as to be arranged along the longitudinal direction of the vehicle at an under surface 30B of the clip seat 30. Each of the ribs 38 is formed such that the distance between the under surface 30B of the clip seat 30 and the bottom edge of the rib 38 becomes longer as the rib 38 extends from a vicinity of the engagement hole 32 formed in the clip seat 30 to the reverse surface 24A of the arm rest lower 24. These ribs 38 reinforce the clip seat 30.

When load in the direction of pulling the arm rest upper 22 (i.e., load which pulls in an upward direction) is applied to the ribs 38, the clip seat 30 bends so as to prevent the arm rest upper 22 from separating from the clip seat 30.

As illustrated in FIG. 4, an engagement pawl 40 projects toward the bottom of the vehicle at a vehicle longitudinal direction and vehicle transverse direction substantially central portion of the under surface of the arm rest upper 22. A pawl portion 40A is formed at the distal end portion of the engagement pawl 40.

As shown in FIG. 5, the pawl portion 40A of the engagement pawl 40 is engaged with the engagement hole 32 of the clip seat 30 of the arm rest lower 24.

Figure 6:
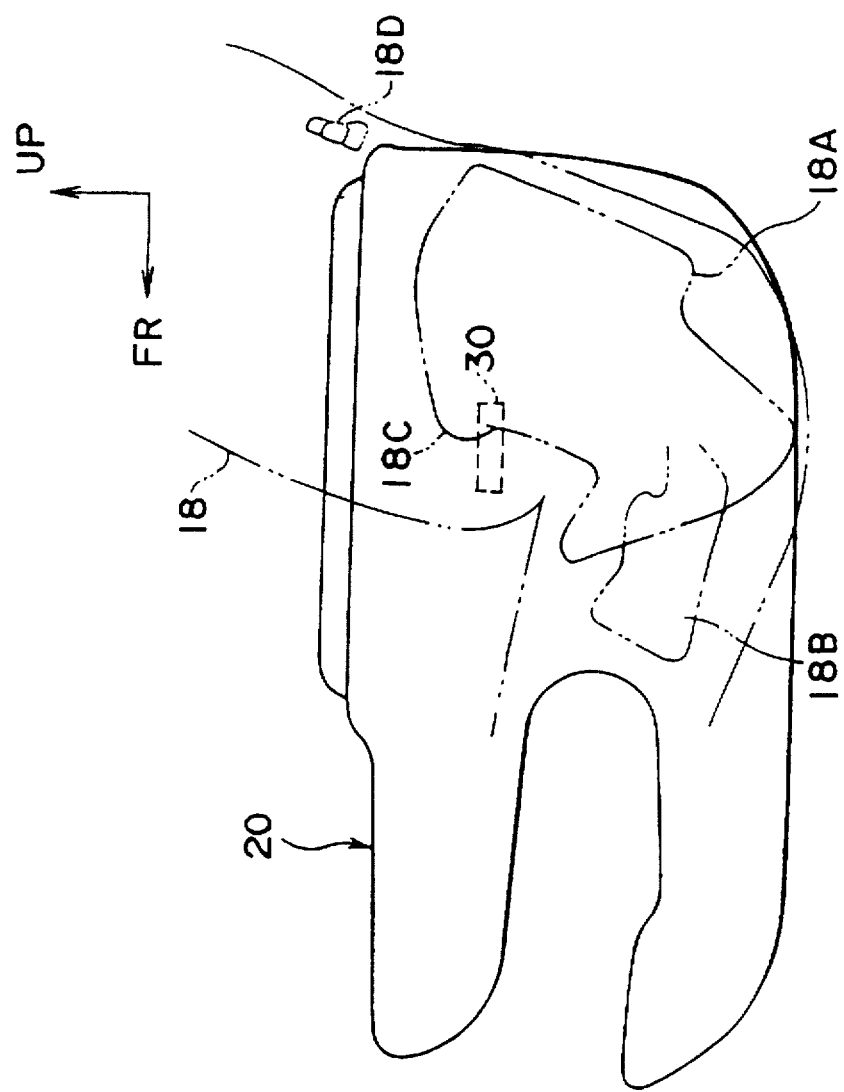
FIG. 6 is a schematic side view illustrating the door trim energy absorbing structure relating to the third embodiment of the present invention.

As shown in FIG. 6, the clip seat 30 corresponds to a region in a vicinity of the ilium 18C of the vehicle occupant 18.

Operation of the third embodiment will now be described.

In the door trim energy absorbing structure of the third embodiment, when a bumper of another vehicle abuts the front side door from a side of the vehicle and presses the front side door in the direction of the vehicle compartment inner side, the arm rest lower 24 of the door trim 16 pushes a vicinity of the pelvis 18A of the vehicle occupant 18 in the direction of the vehicle compartment inner side.

At this time, the distal end portion 30A of the clip seat 30 is inserted in the through hole 34 of the door trim 16 and the through hole 36 of the door inner panel 14. The arm rest lower 24 which protrudes toward the vehicle compartment inner side is easily deformed by the load applied from the vehicle compartment inner side to the vehicle compartment outer side (the state illustrated by the imaginary lines in FIG. 5). Therefore, there is hardly any absorption of energy at the ilium 18C of the vehicle occupant 18 corresponding to the clip seat 30, and energy is actively absorbed only at the femur 18B.

Further, even if the engagement pawl 40 does not deform, because the distal end portion 30A penetrates through the door trim 16 and the ribs 38 are made small, the clip seat 30 deforms as shown by the imaginary lines. In this case as well, there is hardly any absorption of energy at the ilium 18C of the vehicle occupant 18 corresponding to the clip seat 30, and energy is actively absorbed only at the femur 18B. Therefore, the input to the ilium 18C is small, and, due to the rotation of the vehicle occupant 18 as shown in FIG. 2, a theoretically negative acceleration, i.e., acceleration toward the vehicle compartment outer side, is applied to the lumbar vertebrae 18D of the vehicle occupant 18. Therefore, the acceleration generated at the lumbar vertebrae of the vehicle occupant 18 can be reduced. Accordingly, the energy absorbing member can be made small, and narrowing of the space within the vehicle compartment can be suppressed.

Figure 7:
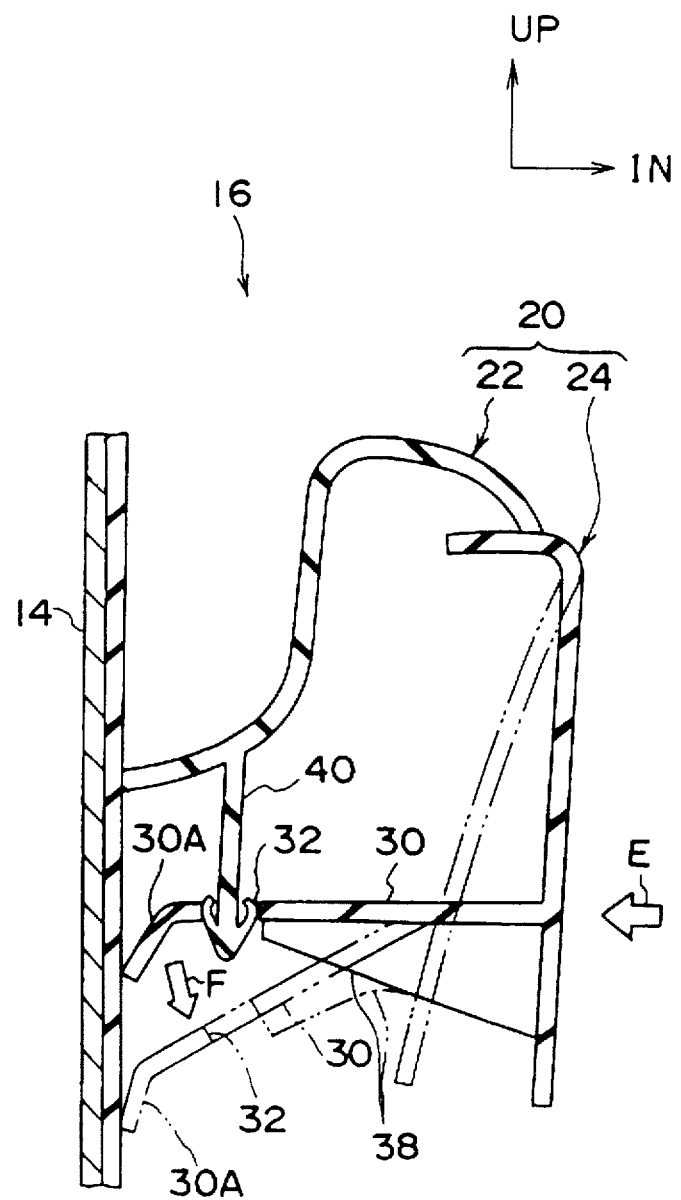
FIG. 7 is a cross-sectional view illustrating a modified example of the door trim energy absorbing structure relating to the third embodiment of the present invention.

In the third embodiment, the distal end portion 30A of the clip seat 30 is inserted in the through hole 34 of the door trim 16 and the through hole 36 of the door inner panel 14. The arm rest lower 24 which protrudes toward the vehicle compartment inner side can easily be deformed by load applied from the vehicle compartment inner side to the vehicle compartment outer side. However, in place of this structure, the following structure illustrated in FIG. 7 may be utilized. The distal end portion 30A of the clip seat 30 is bend downwardly at an angle. When load is applied from the vehicle compartment inner side to the vehicle compartment outer side (i.e., in the direction of arrow E in FIG. 7), the distal end portion 30A of the clip seat 30 slides on the surface of the door trim 16, and the clip seat 30 buckles downwardly (in the direction of arrow F in FIG. 7).

Figure 8:
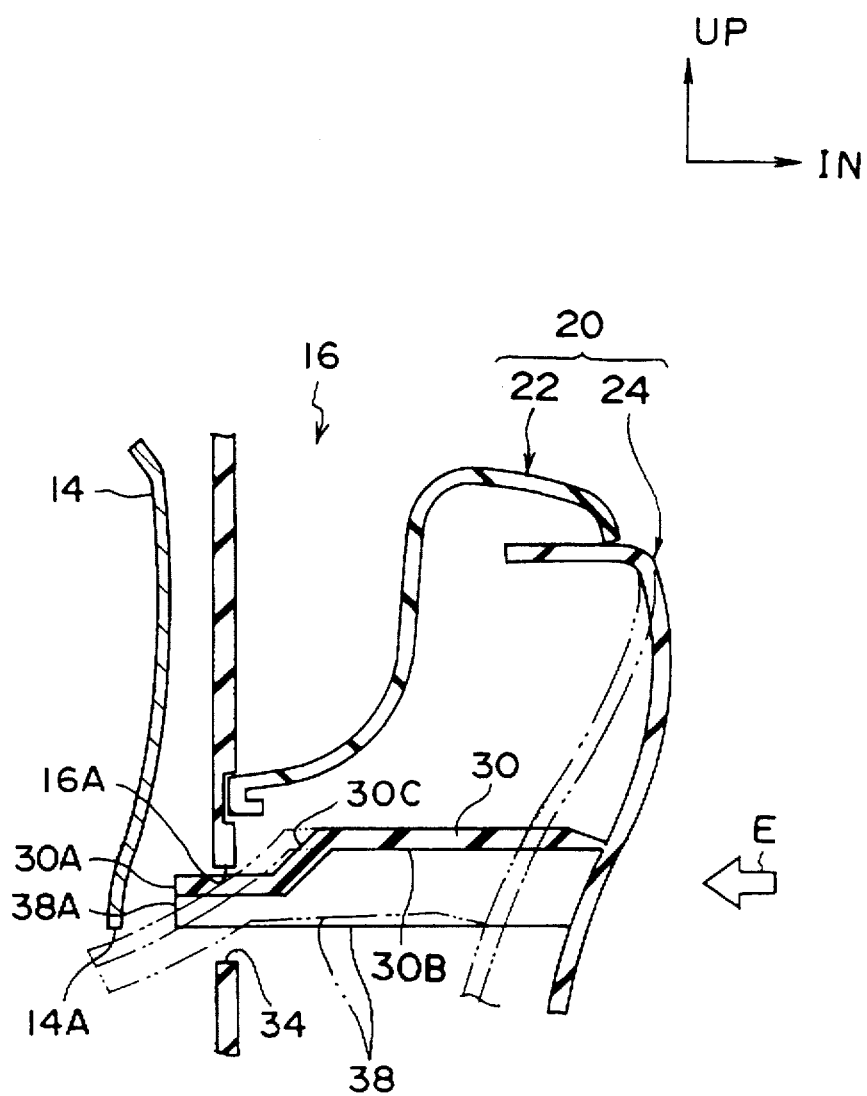
FIG. 8 is a cross-sectional view illustrating another modified example of the door trim energy absorbing structure relating to the third embodiment of the present invention.

In the third embodiment, instead of the above-described structures, the following structure may be utilized. As illustrated in FIG. 8, a crank portion 30C is provided in a vicinity of the distal end portion 30A of the clip seat 30. The plurality of ribs 38 are provided so as to be arranged along the longitudinal direction of the vehicle at the under surface 30B of the clip seat 30. In this structure, when load is applied from the vehicle compartment inner side to the vehicle compartment outer side (i.e., in the direction of arrow E in FIG. 8), the crank portion 30C abuts an edge portion 16A of the door trim 16 and the distal end portion 30A of the clip seat 30 sinks downward. Further, distal end portions 38A of the ribs 38 and the distal end portion 30A of the clip seat 30 move beneath a bottom end portion 14A of the inner panel 14. Therefore, the energy due to the load from the vehicle exterior is absorbed.

Next, a fourth embodiment of the door trim energy absorbing structure of the present invention will be described in accordance with FIGS. 9 and 10.

Portions which are the same as those of the first embodiment are denoted by the same reference numerals, and description thereof is omitted.

Figure 9:
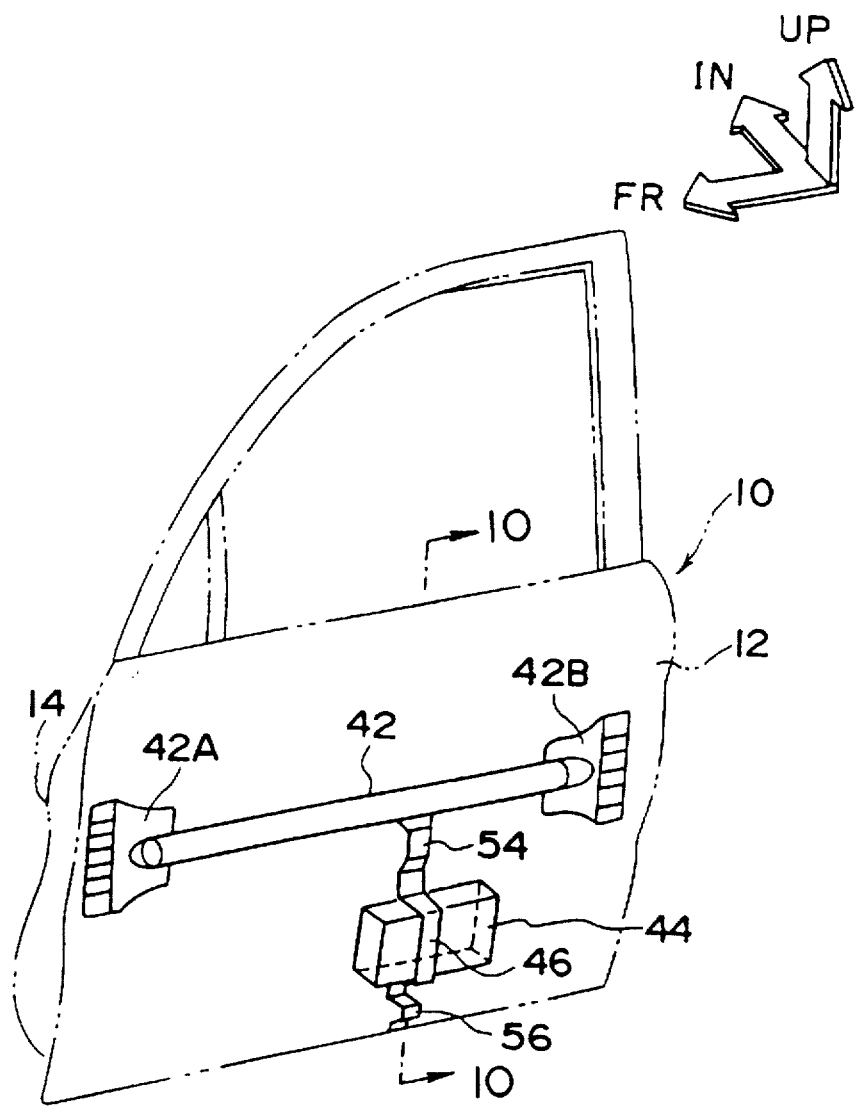
FIG. 9 is a perspective view viewed diagonally and from the front outer side, and illustrating a door trim energy absorbing structure relating to a fourth embodiment of the present invention.

As illustrated in FIG. 9, an impact beam 42, which extends in the longitudinal direction of the front side door 10 for an automobile, is disposed at the interior portion of the front side door 10. The impact beam 42 is fixed to vicinities of both front and rear end portions of the door outer panel 12 by brackets 42A, 42B which are fixed to the vehicle longitudinal direction front and rear ends of the impact beam 42.

Figure 10:
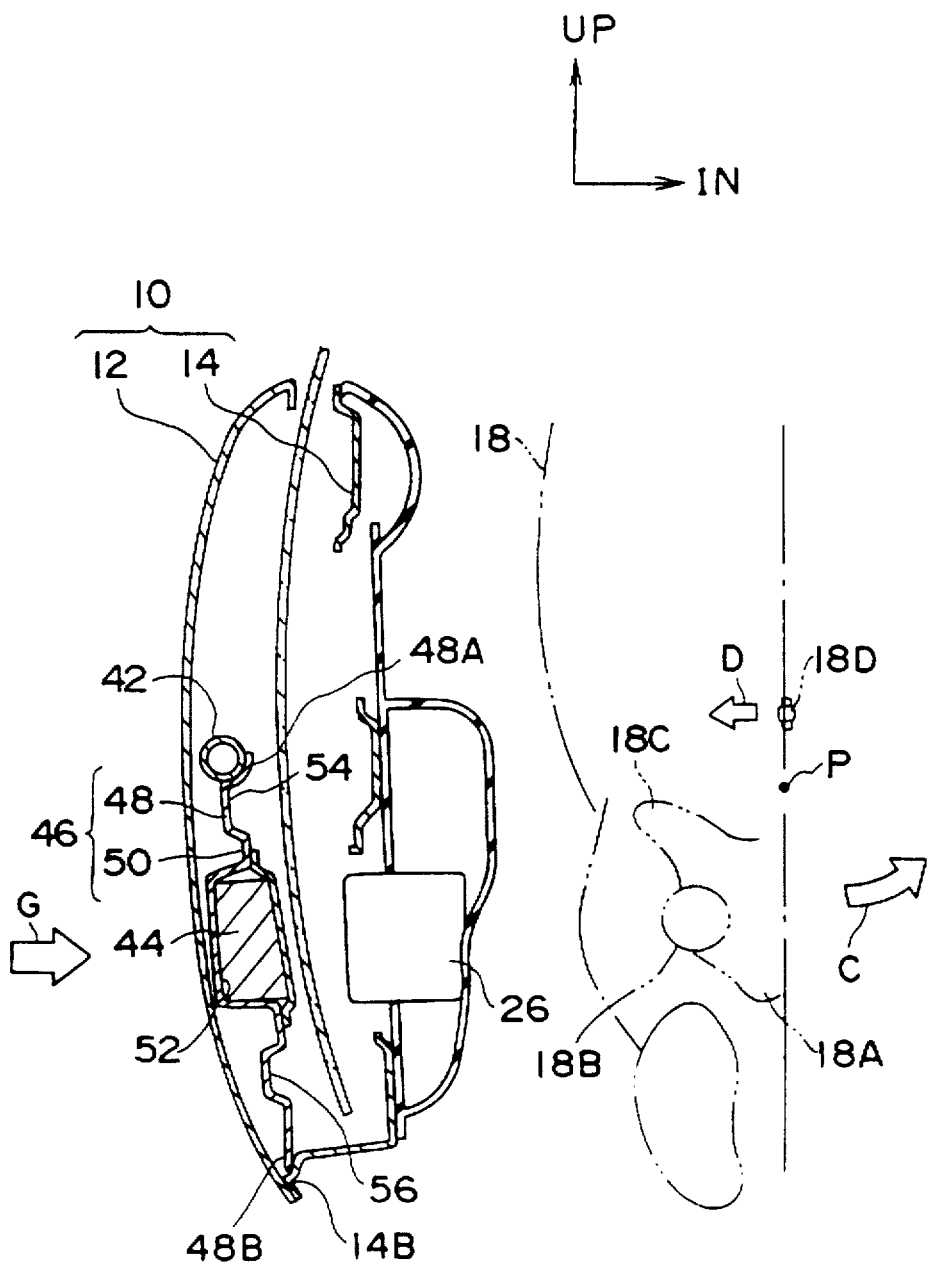
FIG. 10 is a cross-sectional view taken along line 9—9 of FIG. 9.

As illustrated in FIG. 10, an energy absorbing member 44 is disposed so as to be positioned beneath the impact beam 42 and so that the heightwise position of the energy absorbing member 44 is substantially the same as that of the energy absorbing member 26. Viewed from the side, the energy absorbing member 44 is substantially the same size as the energy absorbing member 26. The energy absorbing member 44 is thinner than the energy absorbing member 26. The energy absorbing members 26, 44 have surface areas which can correspond to the position of the femur 18B which moves in accordance with movement of an unillustrated vehicle seat in longitudinal and vertical directions of the vehicle.

As shown in FIG. 9, a strip-shaped bracket 46 is mounted to a front side door 10 longitudinal direction central portion of the energy absorbing member 44.

As illustrated in FIG. 10, the bracket 46 is formed by a main bracket 48 and an auxiliary bracket 50. The energy absorbing member 44 is inserted into a concave portion 52 which is formed at a vertical direction intermediate portion of the main bracket 48 and which protrudes toward the vehicle compartment outer side. The energy absorbing member 44 is held within the concave portion 52 by the auxiliary bracket 50.

An upper end portion 48A of the main bracket 48 is fixed to a vehicle compartment inner side portion of the impact beam 42. A lower end portion 48B of the main bracket 48 is fixed to a vicinity of a lower end portion 14B of the door inner panel 14. A movement regulating portion 54 is formed between the upper end portion 48A of the main bracket 48 and the concave portion 52. A movement regulating portion 56 is formed between the lower end portion 48B of the main bracket 48 and the concave portion 52. Concave portions protruding toward the vehicle compartment outer side are formed at the movement regulating portions 54, 56. When the energy absorbing member 44 moves in the direction of the vehicle compartment inner side (in the direction of arrow G in FIG. 10), the movement regulating portions 54, 56 regulate the vertical direction movement of the energy absorbing member 44.

Next, operation of the fourth embodiment will be described.

In the door trim energy absorbing structure of the fourth embodiment, when a bumper of another vehicle abuts the front side door 10 from a side of the vehicle and pushes the front side door 10 in the direction of the vehicle compartment inner side, the energy absorbing member 44 moves in the direction of arrow G in FIG. 10. At this time, when the energy absorbing member 44 attempts to move in vertical directions due to bending of the impact beam 42 or the like, movement of the energy absorbing member 44 in the direction of arrow G can be controlled by the vertical direction extension and contraction of the movement regulating portions 54, 56.

In this way, the energy absorbing member 44 can effectively abut the energy absorbing member 26 provided at the door inner panel. Accordingly, the energy absorbing member 26, which is relatively small and corresponds to the femur 18B of the vehicle occupant 18, can effectively abut the femur 18B without the energy absorbing member 26 being made large. Narrowing of the space within the vehicle compartment can be suppressed.

Figure 11:
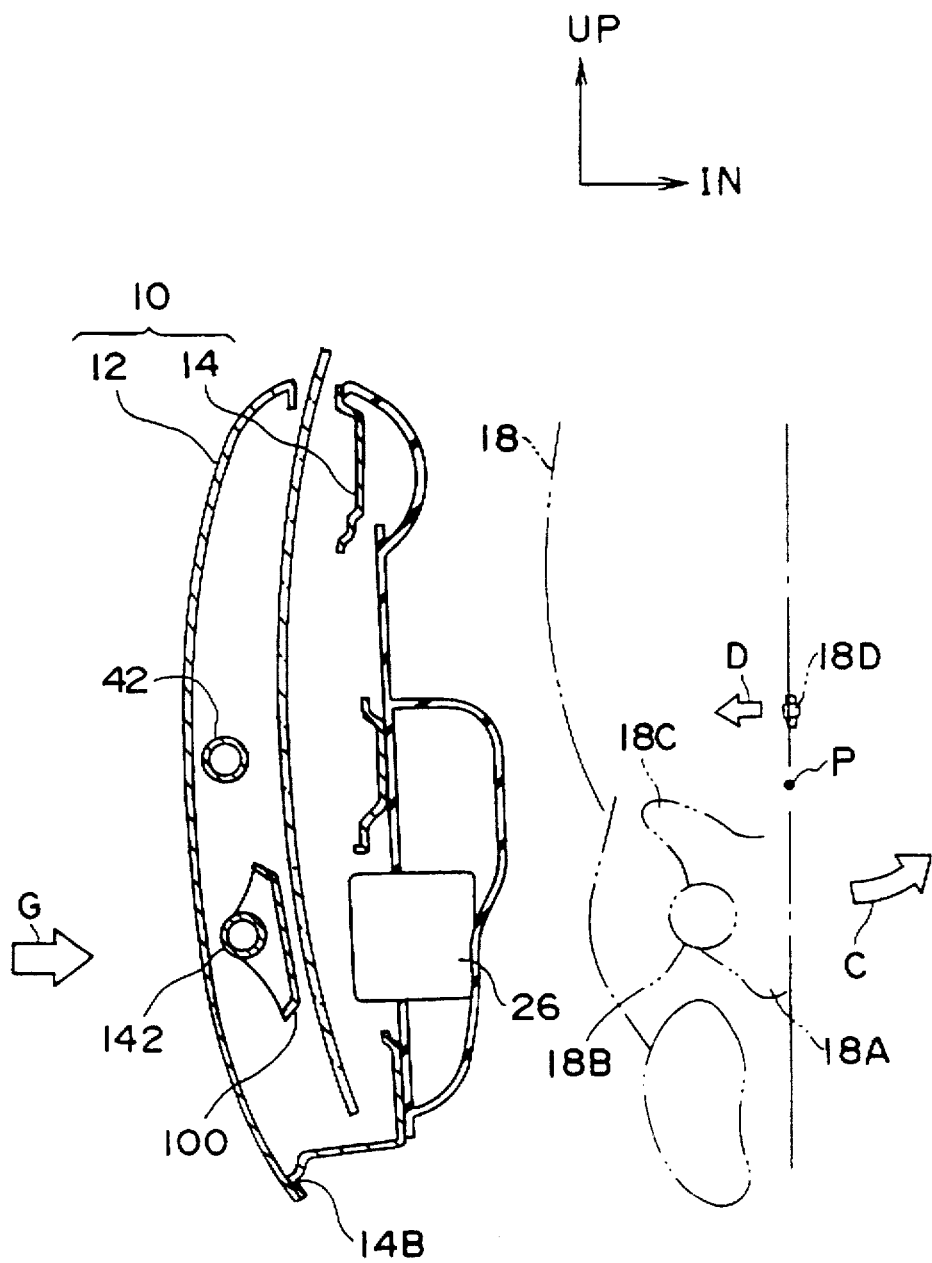
FIG. 11 is a cross-sectional view illustrating a modified example of the door trim energy absorbing structure relating to the fourth embodiment of the present invention.
Figure 12:
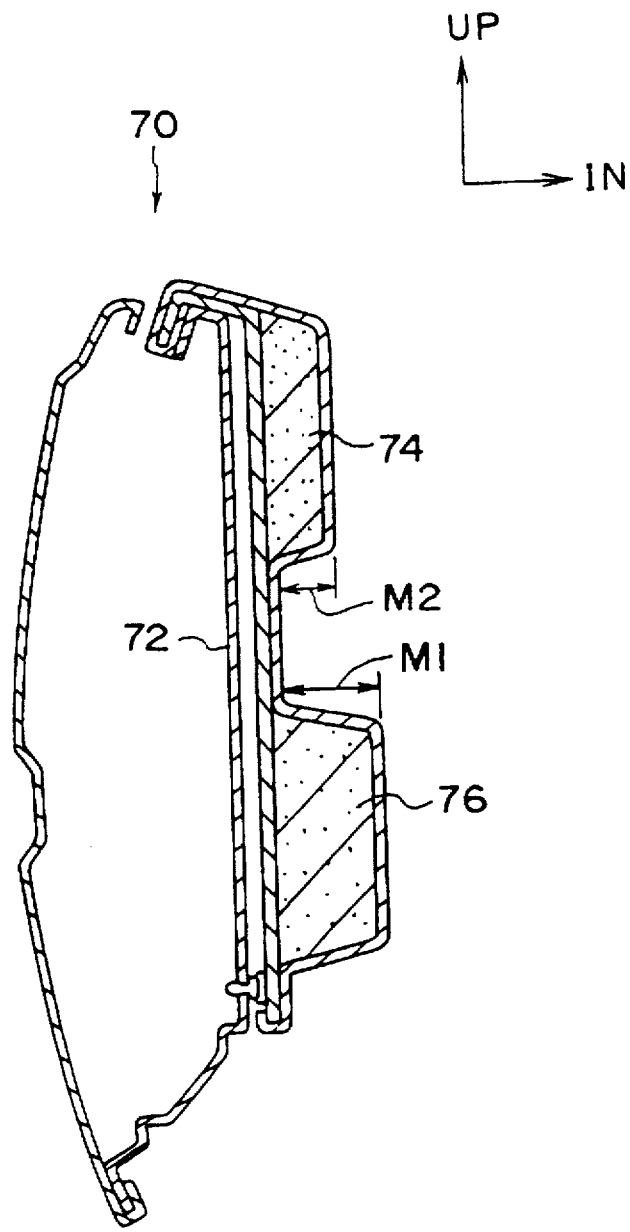
FIG. 12 is a cross-sectional view illustrating a door trim energy absorbing structure relating to a conventional example.

In place of the above-described structure of the fourth embodiment, the following structure illustrated in FIG. 11 may be utilized. An impact beam 142 is provided at substantially the same heightwise position as the energy absorbing member 44 illustrated in FIG. 10. An energy absorbing member 100, which is formed by a plate-shaped metal (specifically, an iron plate) at a position corresponding to the energy absorbing member 26, is fixed by welding or the like to the impact beam 142. In this structure, due to load acting on the front side door 10 from the vehicle exterior, the energy absorbing member 100 moves in the direction of arrow G in FIG. 11 as the impact beam 142 deforms. Due to the movement of the energy absorbing member 100, the energy absorbing member 100 abuts the energy absorbing member 26, and the energy caused by the load from the vehicle exterior is absorbed. Accordingly, in this modified example of the fourth embodiment, the same effects as those of the fourth embodiment are achieved.

In each of the above embodiments, examples are described in which the door trim energy absorbing structure of the present invention is applied to the front side door 10. However, the door trim energy absorbing structure of the present invention is also applicable to other doors such as rear side doors and the like.

What is claimed is:

1. A door trim energy absorbing structure comprising:

a door member disposed at a vehicle side portion;

a door trim provided at a vehicle inner side of said door member, an energy absorbing member absorbing energy from a vehicle exterior and provided at said door trim so as to correspond to a region which is lower than an ilium of a vehicle occupant sitting generally adjacent the door member and which absorbing member is constructed and arranged to actively absorb energy only at the femur, a pushing member constructed and arranged to push said energy absorbing member by a surface of said pushing member contacting a surface of said energy absorbing member, wherein said pushing member is a second energy absorbing member provided at a vehicle outer side with respect to said energy absorbing member, and a second holding member holding said second energy absorbing member at a predetermined position, wherein said second energy absorbing member holding member is a strip-shaped member.

2. A door trim energy absorbing structure according to claim 1, wherein said energy absorbing member is provided between said door trim and a door outer panel which forms said door member.

3. A door trim energy absorbing structure according to claim 2, wherein said energy absorbing member moves in a direction of a vehicle inner side when load is applied to a vehicle side portion from the vehicle exterior.

4. A door trim energy absorbing structure according to claim 1, wherein said energy absorbing member has a surface area which corresponds to a position of a femur of the vehicle occupant even in a case in which a seat provided in a vehicle compartment moves.

5. A door trim energy absorbing structure according to claim 1, wherein said strip-shaped member has a movement regulating member which regulates vertical direction movement of said second energy absorbing member.

6. A door trim energy absorbing structure according to claim 1, further comprising:

an entry restricting member provided between said door trim and a door outer panel of said door member and constructed and arranged to restrict entry of an object from an exterior of a vehicle body.

7. A door trim energy absorbing structure according to claim 6, wherein said entry restricting member is a cylindrical member which extends in longitudinal directions of said door member.

8. A door trim energy absorbing structure according to claim 6, wherein said second energy absorbing member is fitted to said entry restricting member via said second holding member.

9. A door trim energy absorbing structure comprising:

a door member disposed at a vehicle side portion;

a door trim provided at a vehicle inner side of said door member;

an energy absorbing member provided at said door trim so as to correspond to a position in a vicinity of a femur of a vehicle occupant sitting generally adjacent the door member, and being constructed and arranged to absorb energy from a vehicle exterior; and an incorporated member forming said door trim and protruding into a vehicle compartment, said incorporated member absorbing a load applied from a vehicle compartment inner side to a vehicle compartment outer side by a region of said incorporated member, which region corresponds to a position of an ilium of the vehicle occupant, deforming to the load, wherein said incorporated member has an upper arm rest portion and a lower arm rest portion, and said lower arm rest portion has an arm rest fixing member which fixes said upper arm rest portion at a predetermined position.

10. A door trim energy absorbing structure according to claim 9, wherein said arm rest fixing member deforms due to load applied from the vehicle compartment inner side to the vehicle compartment outer side.

11. A door trim energy absorbing structure according to claim 10, wherein said upper arm rest portion has an engagement pawl which engages with said arm rest fixing member.

12. A door trim energy absorbing structure according to claim 11, wherein said arm rest fixing member has ribs which prevent cancellation of engagement of said arm rest fixing member and an engagement pawl provided at said upper arm rest portion, when load applied from the vehicle compartment inner side to the vehicle compartment outer side is received.

13. A door trim energy absorbing structure according to claim 9, wherein said arm rest fixing member has a crank portion, and when load applied from the vehicle compartment inner side to the vehicle compartment outer side is received, said crank portion moves a distal end portion of said arm rest upper fixing member by abutting an edge portion of a through hole formed in said door trim.

14. A door trim energy absorbing structure comprising:

a door member disposed at a vehicle side portion;

a door trim provided at a vehicle inner side of said door member; and an incorporated member forming said door trim and protruding into a vehicle compartment, said incorporated member absorbing load applied from a vehicle compartment inner side to a vehicle compartment outer side by a region of said incorporated member, which region corresponds to a position of an ilium of a vehicle occupant, deforming due to the load;

wherein said incorporated member has an upper arm rest portion and a lower arm rest portion, and said lower arm rest portion has an arm rest fixing member which fixes said upper arm rest portion at a predetermined position, and wherein said arm rest fixing member has a crank portion, and when load applied from the vehicle compartment inner side to the vehicle compartment outer side is received, said crank portion moves a distal end portion of said arm rest fixing member by abutting an edge portion of a through hole formed in said door trim.

* * * * *